United States Patent [19]
Dreyer

[11] B 3,991,606
[45] Nov. 16, 1976

[54] APPARATUS AND METHOD FOR CONVERTING MECHANICAL WAVE ENERGY TO OPTICAL ENERGY

[75] Inventor: John F. Dreyer, Cincinnati, Ohio

[73] Assignee: Minnesota Mining and Manufacturing Company, St. Paul, Minn.

[22] Filed: Nov. 8, 1974

[21] Appl. No.: 522,309

[44] Published under the second Trial Voluntary Protest Program on February 3, 1976 as document No. B 522,309.

[52] U.S. Cl. .......................... 73/67.5 H; 340/5 MP; 350/160 LC
[51] Int. Cl.² ...................... G01N 9/24; G02F 1/13
[58] Field of Search ............. 350/160 LC; 340/5 H, 340/5 MP; 73/67.5 H

[56] References Cited
UNITED STATES PATENTS

| | | | |
|---|---|---|---|
| 3,597,043 | 8/1971 | Dreyer | 350/160 LC UX |
| 3,667,039 | 5/1972 | Garfein et al. | 350/160 LC X |
| 3,831,434 | 8/1974 | Greguss | 73/67.5 H |

OTHER PUBLICATIONS

Ludeman et al., *Liquid–Crystal Cell Having Nonuniform Thickness*, IBM Tech. Discl., vol. 15, No. 4, Sept. 1972.

*Primary Examiner*—Paul L. Gensler
*Attorney, Agent, or Firm*—Alexander, Sell, Steldt & DeLaHunt

[57] ABSTRACT

A piezo-optic cell having a nematic liquid crystal film and first and second wedge-shaped plates on opposite surfaces of the film which serve to vary its frequency response along the length of the cell. The cell is illuminated with polarized light and is insonified by an acoustic wave pattern to produce a real-time visual image of the acoustic wave. By exposing the cell to the applied acoustic energy, one or more resonance conditions are created to produce an extremely strong and well defined image.

15 Claims, 7 Drawing Figures

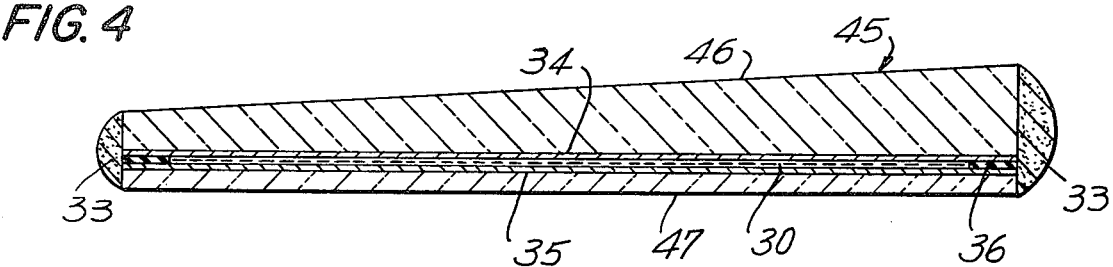
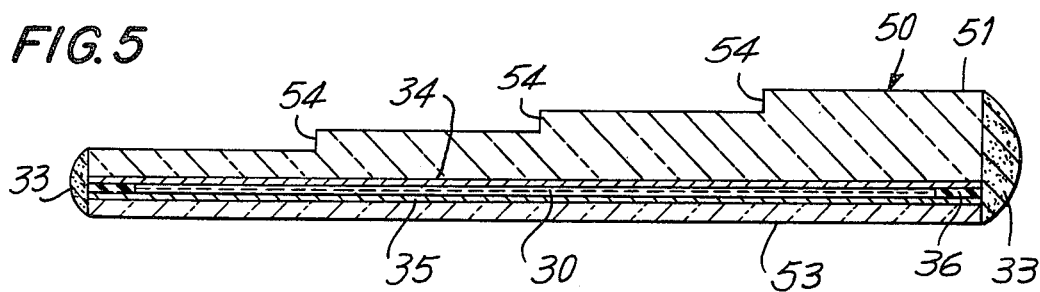
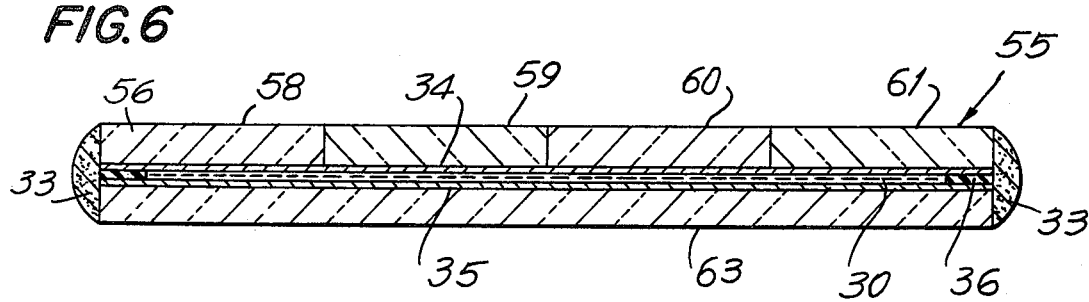
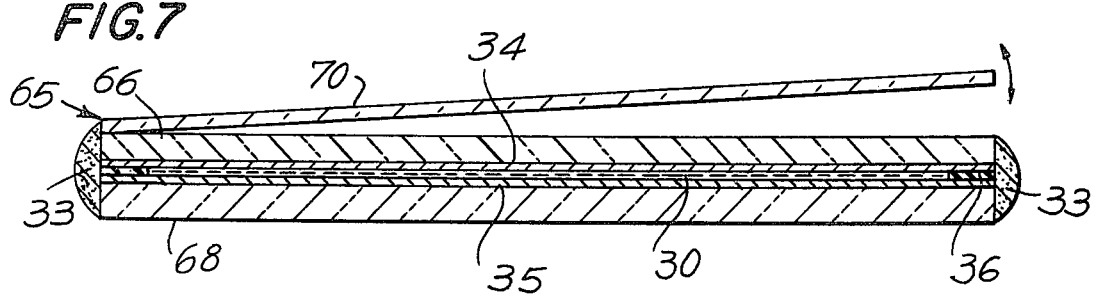

APPARATUS AND METHOD FOR CONVERTING MECHANICAL WAVE ENERGY TO OPTICAL ENERGY

BACKGROUND OF THE INVENTION

This invention relates to optical systems and more particularly to apparatus and methods for the conversion of acoustic or other mechanical wave energy into an optical pattern.

There has been developed an acoustical-to-optical conversion cell which is highly efficient and exhibits good response over a fairly broad frequency range. Representative cells of this type are disclosed, for example, in John F. Dreyer U.S. Pat. No. 3,597,043 granted Aug. 3, 1971, and in Pal Greguss U.S. Pat. No. 3,831,434 granted Aug. 27, 1974. Such cells customarily employ a thin film of a nematic liquid crystal compound which is supported between a pair of transparent or translucent glass plates. The cell is illuminated by polarized light and is viewed through a polarizing filter to provide a real-time visual image of an acoustic wave pattern incident thereon. As used herein, the terms "acoustic", "sonic", etc., are intended to include mechanical energy having a frequency both within and outside the audio frequency spectrum.

The acoustical-to-optical conversion cells employed heretofore have exhibited certain disadvantages. For example, the sensitivity of the cells often varied widely depending upon such factors as their thickness and on the frequency of the applied mechanical wave. In cases in which a resonance condition was created, extremely good sensitivity was observed, but for a cell of uniform response characteristics such resonance existed only over a fairly narrow frequency band.

To achieve optimum resonance the thickness of one of the glass plates plus that of the liquid crystal film should be equal to one-half wavelength (or a whole number multiple thereof) of the applied acoustic energy. In cases in which such frequency matching does not occur, it was often necessary heretofore to substitute a cell of different thickness or to vary the applied frequency in order to achieve a satisfactory image of the acoustic pattern. When attempts were made to tilt the cell relative to the applied ultrasonic beam in an effort to achieve such matching, the pattern was distorted and in many instances was difficult to properly interpret.

SUMMARY

One general object of this invention, therefore, is to provide a new and improved optical apparatus and method for converting acoustic or other mechanical wave energy into optical energy.

More specifically, it is an object of this invention to provide such an apparatus and method which enables the realization of high sensitivity over a wide frequency range.

Another object of the invention is to provide an apparatus and method of the character indicated in which resonance conditions are achieved at particular frequencies to produce an extremely well defined visual image of the mechanical wave.

A further object of the invention is to provide an optical apparatus and method for determining the frequency of mechanical wave energy.

Still another object of the invention is to provide optical apparatus for detecting and displaying a pattern under control of selected ultrasonic frequencies.

A still further object of this invention is to provide new and improved acoustical-to-optical conversion equipment which is economical to manufacture and thoroughly reliable in operation.

In one illustrative embodiment of the invention, an optical cell having a nematic liquid crystal film responsive to wave energy of particular frequencies is positioned in cooperating relationship with an ultrasonic generator. First and second transparent plates are mounted in respective juxtaposition with the opposite surfaces of the film. The mechanical wave energy from the generator is applied to a portion of one of the surfaces of the cell, and the cell is illuminated with polarized light. The cell is viewed through a suitable polarizing filter to detect changes in birefringence in the film as a result of the application of ultrasonic wave energy to the irradiated portion.

In accordance with one feature of the invention, at least one of the plates is effective to vary the frequency response of the liquid crystal film along its irradiated surface such that different portions of the surface are selectively responsive to different applied frequencies. A series of resonance conditions are created for a number of applied frequencies with the result that the cell exhibits extremely high sensitivity over a wide frequency range.

In accordance with another feature of the invention, in several advantageous embodiments, the optical cell is movable relative to the ultrasonic generator to vary the portion of the liquid crystal film to which the acoustic energy is applied. The arrangement is such that the position of the cell may be readily adjusted to achieve optimum resonance and hence sensitivity for the particular acoustic pattern being applied.

In certain important embodiments of the invention, either one or both of the plates are of wedge-shaped configuration, to similarly form a wedge-shaped cell. In other embodiments one of the plates is fabricated from successive sections having different frequency response characteristics, and in still other embodiments a movable plate is provided to enable the adjustment in the frequency band to which the cell is responsive. The apparatus is of simplified construction and should be very useful in nondestructive testing equipment and for other applications requiring high sensitivity.

The present invention as well as further objects and features thereof will become more fully apparent from the following description of certain preferred embodiments, when read with reference to the accompanying drawings.

BRIEF DESCRIPTION OF THE DRAWINGS

FIG. 4 is a vertical sectional view similar to FIG. 2 but illustrating an acoustical-to-optical conversion cell in accordance with another illustrative embodiment of the invention.

FIG. 5 is a vertical sectional view similar to FIG. 2 but illustrating an acoustical-to-optical conversion cell in accordance with a further illustrative embodiment of the invention.

FIG. 6 is a vertical sectional view similar to FIG. 2 but illustrating an acoustical-to-optical conversion cell in accordance with still another illustrative embodiment of the invention.

FIG. 7 is a vertical sectional view similar to FIG. 2 but illustrating an acoustical-to-optical conversion cell in accordance with a still further illustrative embodiment of the invention.

DESCRIPTION OF CERTAIN PREFERRED EMBODIMENTS

Figure 1:
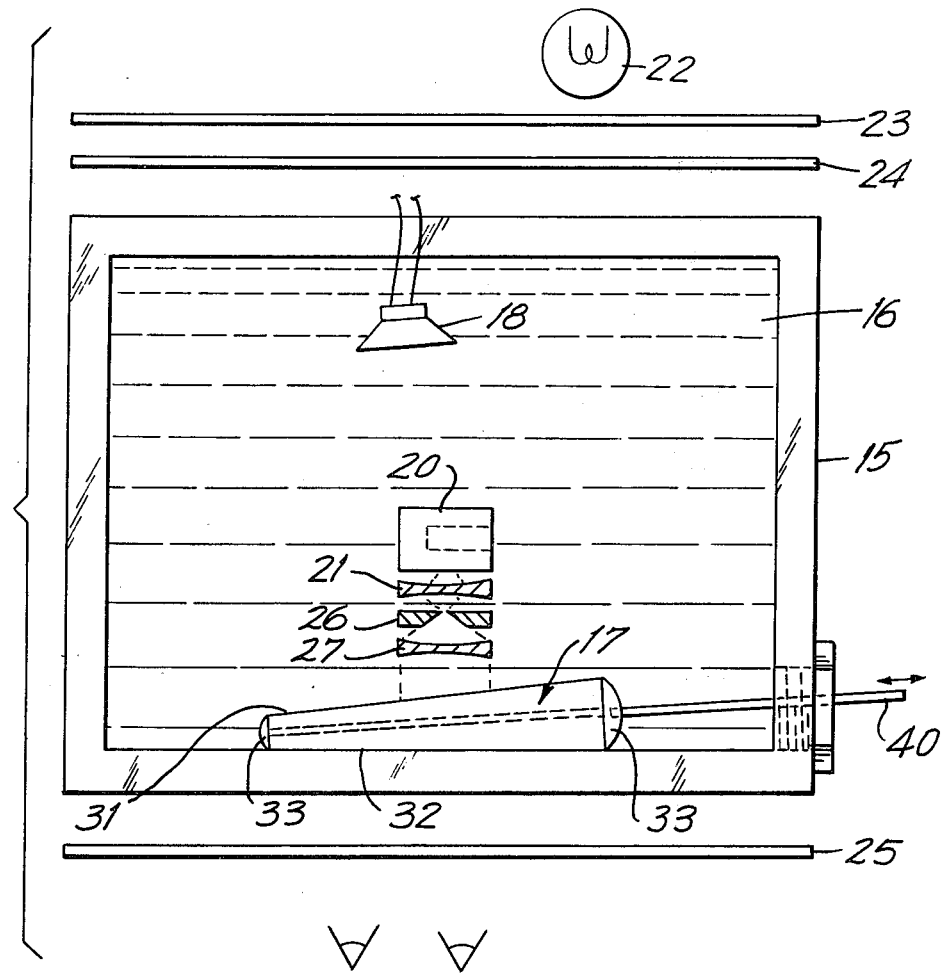
FIG. 1 is a schematic representation of optical apparatus for practicing the method in accordance with one illustrative embodiment of the invention.

Referring to FIG. 1 of the drawings, there is shown a container 15 which illustratively is fabricated from clear acrylic plastic. The container 15 is filled with a suitable liquid 16 which preferably comprises water having a small amount of wetting agent therein. The liquid 16 completely fills the container 15 to avoid air spaces and the attendant liquid surfaces.

An acoustical-to-optical conversion cell 17 and an ultrasonic generator 18 are immersed within the liquid 16 adjacent opposite portions of the container 15. The ultrasonic generator 18 illustratively comprises a piezoelectric transducer having an output frequency in the 1 to 10 MHz. range and is located in position to direct mechanical wave energy toward a test sample 20 interposed between the generator and the cell. The sample 20 illustratively may comprise a test specimen of a metal alloy, for example, the grain size of which is to be determined by optical examination of the cell. The ultrasonic energy proceeds from the sample 20 to the adjacent surface of the cell which is oriented in a plane normal to the incident ultrasonic wave.

In cases in which it is desired to form a hologram on the conversion cell 17, the ultrasonic energy proceeds directly from the sample 20 to the irradiated side of the cell. In other advantageous embodiments, such as in situations where a visually recognizable image is to be produced on the cell 17, a lens system is interposed between the sample and the cell. In the embodiment illustrated in FIG. 1, for example, this lens system includes a concave focusing lens 21 which receives the energy from the sample and focuses it on the pin hole aperture of a spatial filter 26. The energy is then collimated by a collimating lens 27 where it is converted into parallel rays perpendicular to the cell's longitudinal axis.

In the illustrated embodiment the conversion cell 17 is immersed in the liquid 16 with both faces of the cell exposed to the liquid, and the cell is observed from outside the container through a suitable transparent insert in the adjacent container wall. In other good arrangements the cell may have one of its faces exposed to the air. Thus, the cell may form a part of the wall of the container, for example, with its upper face, as viewed in FIG. 1, in contact with the liquid 16 and its lower or viewing face exposed to the atmosphere.

The conversion cell 17 preferably is of the piezo-optic type and is illuminated by a suitable light source 22. The source 22 is externally located with respect to the container 15 on the side thereof opposite that which supports the cell 17. A diffuser 23 and a linear polarizer 24 are interposed between the source 22 and the container 15 to provide polarized light incident on the inner surface of the cell. The visually converted ultrasonic image of the sample 20 appears on the opposite surface of the cell when viewed through a polarizing filter 25. The image on the cell may be detected visually or through the use of photocells or other conventional electrical detectors.

Figure 2:
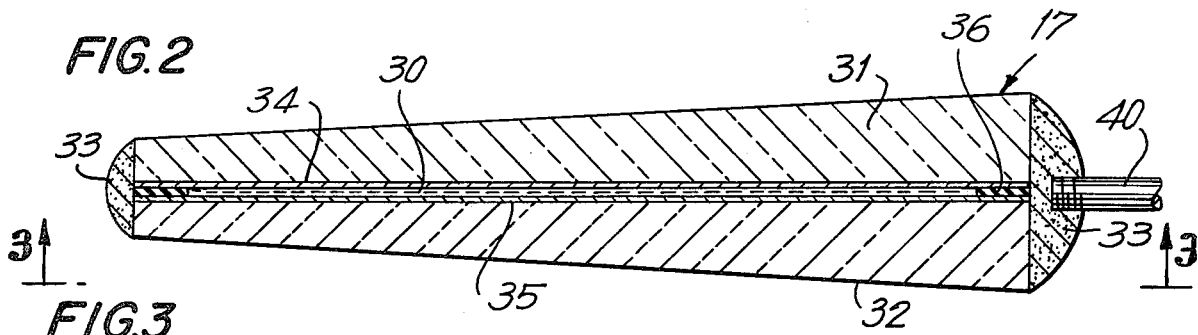
FIG. 2 is an enlarged vertical sectional view of the acoustical-to-optical conversion cell illustrated in the apparatus of FIG. 1.

As best shown in FIG. 2, the piezo-optical cell 17 includes a nematic liquid crystal film 30 of organic material which is responsive to mechanical wave energy of particular frequencies. The liquid crystals in the film 30 are in the homeotropic state, and illustratively may comprise a transparent or translucent thermotropic colorless material, such as p-n-proproxy benzoic acid, or a colored material such as anisal-alpha-benzolazo-alphanapthylamine. For a more detailed discussion of representative materials for the film 30, reference may be had, for example, to Dreyer Pat. No. 3,597,043 referred to above.

Positioned in respective juxtaposition with the opposite surface of the liquid crystal film 30 are two plates 31 and 32 of glass or other transparent or translucent material. The plates 31 and 32 are maintained in rigid relationship with each other by epoxy cement 33 along the adjacent edges of the plates to form a unitary cell assembly. A spacer 36, illustratively of Mylar polyethylene terephthalate having a thickness of 1 mil, extends between the plates 31 and 32 around the periphery of the film 30 to provide the desired separation between the plates. Alternatively, Teflon or other suitable 1 mil diameter powder may be added to the liquid crystal material for this purpose.

The surfaces of the film 30 are separated from the plates 31 and 32 by respective lecithin layers 34 and 35 on opposite sides of the film. These layers serve to counteract the effect of surface orientation of the plates, and it is currently postulated that one end of the lecithin molecule is attracted to the polarity of the adjacent plate and the other end is attracted to the film. When the cell assembly is illuminated with polarized light from the source 22, the diffuser 23 and the polarizer 24, and is insonified by the acoustic wave pattern from the generator 18, there is provided a real-time visual color image of the acoustic pattern which may be detached by viewing the cell through the polarizing filter 25.

Figure 3:
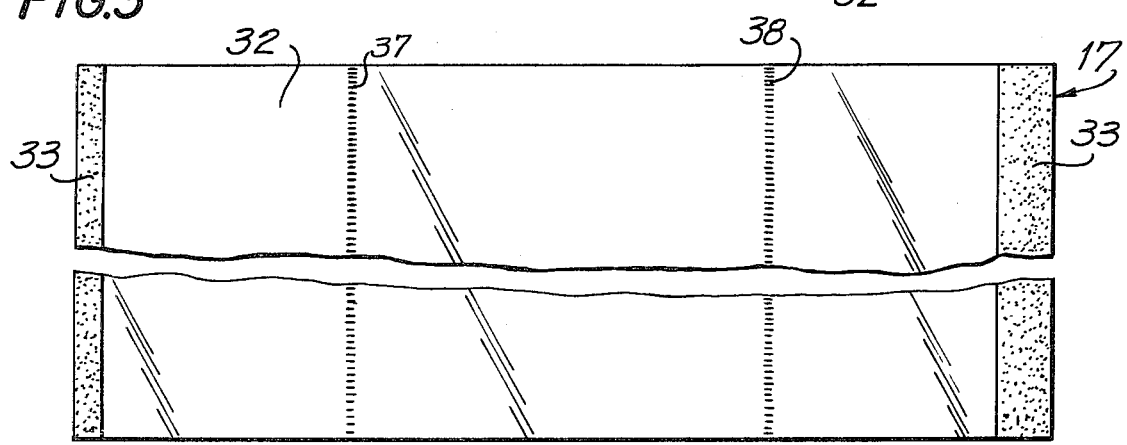
FIG. 3 is a fragmentary plan view of the cell shown in FIG. 2 taken along line 3—3 of FIG. 2.

In an acoustical-to-optical conversion cell of the type illustrated at 17 in FIGS. 1–3, optimum sensitivity takes place when the cell is in a resonance condition in either shear or compression. To achieve such resonance the thickness of the liquid crystal film 30 plus the thickness of one of the adjacent plates 31 or 32 should be equal to one-half the wavelength (or a whole number multiple thereof) of the incident acoustic energy from the generator 18.

The thickness of the liquid crystal film 30 may vary over a comparatively wide range. In cases in which the film has a thickness of about one-half mil or less, color patterns may be produced which range through the visible spectrum from red to blue. When the thickness exceeds about 1 mil, the resulting patterns tend to be monochromatic, with the color usually determined by the basic color of the polarizing filters. Depending upon the visual effects desired, the film thickness should be less than about 10 mils for best results.

The thickness of each of the glass plates 31 and 32, on the other hand, varies continuously along the adjacent surface of the liquid crystal film 30. Each of the plates 31 and 32 is of wedge-shaped configuration. The thicker ends of the plates 31 and 32 are oriented adjacent one another to similarly provide wedge configuration for the full assembly. In the illustrative embodiment of FIGS. 1–3, for example, the overall thickness of the optical cell 17 at the thin or left edge is 0.225 inches, while the thickness at the thick end is 0.440 inches. The length of the cell between the thin and thick ends is 2 inches. The thickness of the nematic film 30 is of course uniform and in the embodiment shown is 0.001 inches. Because of the continuously varying thickness of the wedge-shaped plates 31 and 32, the plates are effective to vary the frequency response of the film along its irradiated surface such that different portions of the surface are selectively responsive to different applied frequencies.

Upon the application of ultrasonic or other mechanical wave energy to the cell 17, both the shear and the compression waves pass through the plate 31 to produce changes in birefringence in the liquid crystal film 30. The extent of the change, and hence the sensitivity of the assembly, is substantially augmented at the particular points at which the applied frequency matches the resonance frequency of the cell at these points as determined by the wedge thickness.

The arrangement is such that the cell 17 responds to a specific frequency at a particular portion of its insonified surface. The cell may respond to multiple frequencies at one time and thus form a pattern. In cases in which the applied frequency distribution is unknown, it may readily be determined through the use of a frequency calibrated cell by comparing the observed pattern with patterns of known frequency distribution. In another illustration, a particular frequency is applied to the cell to produce resonance at a specific area and thus render visible a character, number, etc. Similarly, to determine the presence of flaws in a foundry casting, for example, or to ascertain other selected characteristics of a test sample, the sample is irradiated with an acoustic wave pattern, and the reflected sonic energy is directed to the cell to produce resonance at successive portions of its exposed surface in accordance with the particular applied frequencies. In response to the selected frequencies, the flaws produce specific optical patterns on the viewing side of the cell which are related to the size of the flaws and their location.

In an illustrative example of an acoustical-to-optical conversion cell having the dimensions referred to above, the application of ultrasonic energy at a frequency of 2 MHz formed a pattern composed of two lines, shown schematically at 37 and 38 in FIG. 3, across the uniform thickness direction of the cell. As the applied frequency was increased, the lines moved toward the thinner side of the cell, and as the frequency was decreased they moved toward the thicker side. In each case the lines were accurately representative of the applied ultrasonic energy.

In certain advantageous embodiments the mechanical wave energy from the ultrasonic generator 18 is directed toward only a portion of the exposed surface of the piezo-optic cell 17. The cell 17 is movable within the container 15, as by a suitable control rod 40, in a direction to change the thickness of the exposed portion of the cell until one or more resonance conditions are produced. The position of the cell relative to the ultrasonic generator may thus be adjusted to provide optimum resonance and hence sensitivity for the applied energy. As the cell is moved to the left from the position illustrated in FIG. 1, the exposed thickness increases and the resonant frequency is decreased. Conversely, movement of the cell to the right, as viewed in this figure, exposes decreasing thicknesses to the ultrasonic energy and hence increases the resonant frequency.

To enhance the coupling action of the liquid 16 within the container 15, suitable liquid couplers such as glycerine are employed. The container is constructed as an anechoic liquid chamber to eliminate unwanted ultrasonic reflections from the nematic cell 17. In some embodiments the material within the container need not be in liquid form but may comprise air or other gaseous material or even a suitable solid.

FIGS. 4–7 are illustrative of alternative piezo-optic cells that may be substituted for the cell 17 in the container 15 of FIG. 1. Referring to FIG. 4, there is shown a piezo-optic cell 45 in accordance with another preferred embodiment of the invention. The cell 45 includes the nematic liquid crystal film 30 and the lecithin layers 34 and 35 as in the previously described embodiment, together with first and second glass plates 46 and 47 which are arrayed in respective juxtaposition with opposite surfaces of the film. The plate 46 is in contact with the liquid coupling medium 16 (FIG. 1) on the ultrasonic impinging side of the cell and is of wedge-shaped configuration with dimensions which illustratively may be the same as those of the plate 31 in FIG. 2. The plate 47, on the other hand, is of uniform thickness which for the dimensions given may be of the order of 0.125 inches.

Upon the application of ultrasonic wave energy of particular frequencies to the piezo-optic cell 45, a series of resonance conditions is created at successive portions of the irradiated surface of the wedge-shaped plate 46. The plate 46 is effective to vary the frequency response of the liquid crystal film 30 such that the successive portions are selectively responsive to different applied frequencies. The resulting changes in birefringence of the film are detected in a manner similar to that described heretofore.

In a modification of the embodiment shown in FIG. 4, the piezo-optic cell 45 is inverted such that the flat plate 47 is exposed to the ultrasonic energy. Although the sensitivity of the thus inverted cell is not as great as when the applied energy is directed to the wedge-shaped plate 46, variations in frequency response take place along the length of the cell such that it is selectively responsive to different applied frequencies.

In the embodiments illustrated in FIGS. 1–4, the wedge-shaped plates each exhibit a uniform slope to provide a flat surface lying in a plane which meets the plane of the liquid crystal film at a small acute angle. In other advantageous arrangements, for a given cell the slope of the plate may be varied in accordance with the applied frequencies and the particular portions of the cell at which resonance is to occur. Referring to FIG. 5, for example, there is shown a piezo-optic cell 50 having an upper transparent or translucent plate 51 and a lower plate 53 of similar material. The upper plate 51 is provided with a series of steps 54 located at abrupt changes in thickness of the plate. The thickness of the right portion of the cell 50, as viewed in FIG. 5, is uniform and comparatively thick. The thickness decreases along the length of the cell in successive discrete increments to provide four uniform-thickness areas having different frequency response characteristics.

When the cell 50 is irradiated with ultrasonic energy of the particular frequencies determined by the successive cell thicknesses, resonance conditions are created at each of the four successive areas along the length of the cell. The cell exhibits high sensitivity at the particular applied frequencies, and the resulting changes in birefringence are readily observed and detected in the manner described above.

Much this same effect may be achieved by varying the type of material for the irradiated surface of the cell. Referring to FIG. 6, there is shown a piezo-optic cell 55 having a flat upper plate 56 of uniform thickness in facing juxtaposition with the liquid crystal film 30. The plate 56 is fabricated from four strips or sections 58, 59, 60 and 61 of different types of materials having different frequency response characteristics. Thus, in the illustrated embodiment the material for the sections 58, 59, 60 and 61 varies from a conventional crown glass composition to a flint glass along the length of the cell such that each section has a different acoustic velocity and produces resonance and hence high sensitivity at a different applied frequency. The cell assembly is completed by a lower glass plate 63 of a thickness which preferably is equal to that of the upper plate 56. In the embodiment shown the plate 63 is uniform from one end of the cell to the other, although in certain alternative arrangements even better sensitivity may be achieved by using a lower plate which is fabricated from different types of glass in a manner similar to that of the upper plate. The thicknesses and glass compositions employed on the two plates may be designed to produce resonance at a number of preselected frequencies.

Referring now to FIG. 7, there is shown a piezo-optic cell 65 in accordance with still another embodiment of the invention. The cell 65 includes the liquid crystal film 30 and the lecithin layers 34 and 35 of the previously described embodiments and additionally is provided with a pair of flat glass plates 66 and 68 in respective juxtaposition with opposite surfaces of the film. Angularly disposed with respect to the plate 66 is a sloping plate 70 of glass or other transparent or translucent material. The plate 70 meets the plate 66 at a small acute angle at the left end of the cell 65, as viewed in FIG. 7, and the right end of the plate is spaced from the corresponding end of the cell by a distance which illustratively is of the order of 0.0623 inches for a cell having a length of about 5 inches.

The angular location of the plate 70 provides a wedge-shaped space between the plate 70 and the plate 66. This space performs a function similar to that of the wedge-shaped plate 46 in the embodiment of FIG. 4, for example. When the cell 65 is immersed in the liquid-filled container 15 (FIG. 1), a liquid wedge is formed which serves to vary the frequency response of the cell at successive portions of its irradiated surface. The cell exhibits high sensitivity only where the thickness of a given section of the liquid wedge is in resonance with a particular applied frequency.

By varying the angle between the plates 66 and 70, the frequency response characteristics of the cell 65 may be adjusted in accordance with the particular operating parameters. This angle should be sufficiently small, however, such that with an ultrasonic wave perpendicular to the irradiated surface of the cell the plate 70 will transmit the wave at the desired frequency.

In cases in which the apparatus of FIG. 7 is employed to determine particular characteristics of a liquid, the wedge-shaped space between the plates 66 and 70 is closed on three sides, and the wedge is irradiated with ultrasonic energy of predetermined frequencies. The optical pattern on the opposite surface of the cell is detected to ascertain the selected characteristics of the liquid being measured.

The terms and expressions which have been employed are used as terms of description and not of limitation, and there is no intention in the use such terms and expressions of excluding any equivalents of the features shown and described, or portions thereof, it being recognized that various modifications are possible within the scope of the invention claimed.

What is claimed is:
1. Optical apparatus comprising, in combination:
an optical cell having a nematic liquid crystal film responsive to mechanical wave energy of particular frequencies;
means for generating mechanical wave energy and applying the same to one of the surfaces of the liquid crystal film to produce an optical pattern;
first and second plate means in respective juxtaposition with opposite surfaces of the liquid crystal film, at least one of the plate means being positioned between the wave energy generating means and said liquid crystal film and formed with successive portions that are responsive to different applied frequencies for varying the frequency response of the film at successive portions of said one surface; and
detecting means for observing the optical pattern resulting from the application of mechanical wave energy to selected ones of said portions.
2. Optical apparatus comprising, in combination:
an optical cell including a pair of opposed surfaces and having a liquid crystal film responsive to mechanical wave energy of particular frequencies;
means for generating mechanical wave energy and applying the same to one of the surfaces of the cell to produce an optical pattern;
first and second plate means in respective juxtaposition with opposite surfaces of the liquid crystal film, at least one of the plate means being positioned between said wave energy generating means and said liquid crystal film and being of wedge-shaped configuration to vary the frequency response of the cell at successive portions of said one surface, the successive portions being selectively responsive to different applied frequencies; and
means for observing the optical pattern resulting from the application of mechanical wave energy to selected ones of said portions.
3. Optical apparatus as defined in claim 2, in which each of the plate means is of wedge-shaped configuration.
4. Optical apparatus comprising, in combination:
a wedge-shaped optical cell including a pair of opposed surfaces and having a nematic liquid crystal film responsive to mechanical wave energy of particular frequencies;
means for generating mechanical wave energy and applying the same to one of the surfaces of the cell to produce an optical pattern;
first and second plate means in respective juxtaposition with opposite surfaces of the liquid crystal film, at least one of the plate means being positioned between the wave energy generating means, and said liquid crystal film and being of wedge-shaped configuration to vary the frequency response of the cell at successive portions of said one surface, the successive portions being selectively responsive to different applied frequencies; and detecting means for observing the optical pattern resulting from the application of mechanical wave energy to selected ones of said portions.

5. Optical apparatus comprising in combination:

an optical cell having a nematic liquid crystal film responsive to mechanical wave energy of particular frequencies;

means for generating mechanical wave energy and applying the same to one of the surfaces of the liquid crystal film to produce an optical pattern;

first and second plate means in respective juxtaposition with opposite surfaces of the liquid crystal film, at least one of the plate means being positioned between the wave energy generating means and said liquid crystal film and having portions of varying thickness to thereby vary the frequency response of the film along said one surface; and detecting means for observing the optical pattern resulting from the application of mechanical wave energy to said one surface.

6. Optical apparatus as defined in claim 5, in which said one plate means is provided with a series of steps.

7. Optical apparatus comprising, in combination:

an optical cell having a nematic liquid crystal film responsive to mechanical wave energy of particular frequencies;

means for generating mechanical wave energy and applying the same to one of the surfaces of the liquid crystal film to produce an optical pattern;

first and second plate means in respective juxtaposition with opposite surfaces of the liquid crystal film, at least one of the plate means including a series of sections of different materials having different frequency response characteristics to thereby vary the frequency response of the film at successive portions of said one surface, the successive portions being selectively responsive to different applied frequencies; and detecting means for observing the optical pattern resulting from the application of mechanical wave energy to selected ones of said portions.

8. Optical apparatus comprising, in combination:

an optical cell having a nematic liquid crystal film responsive to mechanical wave energy of particular frequencies;

means for generating mechanical wave energy and applying the same to one of the surfaces of the liquid crystal film to produce an optical pattern;

first and second plate means in respective juxtaposition with opposite surfaces of the liquid crystal film, at least one of the plate means is positioned between the wave energy generating means and said liquid crystal film and comprises a pair of flat faces which are oriented at a small angle with respect to each other to thereby vary the frequency response of the film at successive portions of said one surface, the successive portions being selectively responsive to different applied frequencies; and detecting means for observing the optical pattern resulting from the application of mechanical wave energy to selected ones of said portions.

9. Optical apparatus comprising, in combination:

an optical cell having a nematic liquid crystal film responsive to mechanical wave energy of particular frequencies;

means for generating mechanical wave energy and applying the same to one of the surfaces of the liquid crystal film;

first and second plate means in respective juxtaposition with opposite surfaces of the liquid crystal film, at least one of the plate means being positioned between the wave energy generating means and said liquid crystal film and formed with successive portions that are responsive to different applied frequencies for varying the frequency response of the film at succesive portions of said one surface, the successive portions being selectively responsive to different applied frequencies;

detecting means for observing changes in birefringence in the liquid crystal film as a result of the application of mechanical wave energy to selected ones of said portions; and means for moving the optical cell relative to the generating means to vary the portion of the film to which the generated energy is applied.

10. A method for optically detecting a pattern of wave energy comprising, in combination:

generating mechanical wave energy of particular frequencies;

directing the generated energy to an object under test and then to an optical cell responsive to mechanical wave energy of particular frequencies to produce an optical pattern, the optical cell having a liquid crystal film and first and second plate means in respective juxtaposition with opposite surfaces of the film;

varying the frequency response of the optical cell at successive portions thereof by varying the thickness of at least one of the plate means which is positioned between the wave energy generating means and said liquid crystal film and is formed with successive portions being responsive to different applied frequencies; and detecting the optical pattern resulting from the application of mechanical wave energy to selected ones of said portions;

11. A method as defined in claim 10, which further comprises:

moving the optical cell relative to the mechanical wave energy directed thereto to expose a different portion of said cell to said energy.

12. A method for optically detecting a pattern of wave energy, comprising, in combination:

generating mechanical wave energy of particular frequencies;

directing the generated energy to an optical cell responsive to mechanical wave energy of particular frequencies to produce an optical pattern, the optical cell having a nematic liquid crystal film and first and second plate means in respective juxtaposition with opposite surfaces of the film;

varying the frequency response of the optical cell at successive portions thereof by positioning third plate means at an angle with respect to one of said first and second plate means, the successive portions being responsive to different applied frequencies; and detecting the optical pattern resulting from the application of mechanical wave energy to selected ones of said portions.

13. A method for optically detecting a pattern of wave energy, comprising, in combination:

generating mechanical wave energy of particular frequencies;

directing the generated energy to one portion of an optical cell responsive to mechanical wave energy of particular frequencies, the optical cell having a liquid crystal film and first and second plate means in respective juxtaposition with opposite surfaces of the film;

varying said one portion of the optical cell to which said generated energy is directed by moving the cell relative to the mechanical wave energy directed thereto, the successive portions of said cell being responsive to different applied frequencies due to the manner in which said cell is formed; and detecting changes in birefringence in the liquid crystal film as a result of the application of mechanical wave energy to selected ones of said portions.

14. A method for optically detecting a pattern of wave energy, comprising, in combination:

generating mechanical wave energy of particular frequencies;

directing the generated energy to an object under test and then to one portion of an optical cell responsive to mechanical wave energy of particular frequencies to produce an optical pattern, the optical cell having a nematic liquid crystal film and first and second plate means in respective juxtaposition with opposite surfaces of the film;

varying the portion of the optical cell to which said generated energy is directed by moving the cell relative to the mechanical wave energy directed thereto, the successive portions of said cell being responsive to different applied frequencies due to the form of said cell; and detecting the changes in birefringence in the liquid crystal film as a result of the application of mechanical wave energy to selected ones of said portions.

15. A method for optically detecting a pattern of wave energy comprising, in combination:

forming an optical cell that responds to mechanical wave energy of particular frequencies to produce an optical pattern and includes a liquid crystal film and first and second plate means in respective juxtaposition with opposite surfaces of the film, one of said first and second plate means being adapted to vary the frequency response of said optical cell at successive portions thereof as a result of its construction;

generating mechanical wave energy of particular frequencies;

directing the generated energy to one portion of an optical cell;

varying said one portion of the optical cell to which the wave energy is directed by moving the cell relative to said wave energy, the successive portions of said cell being responsive to different applied frequencies; and detecting the optical pattern resulting from the application of said wave energy to selected ones of said portions.

* * * * *